United States Patent [19]

Endoh et al.

[11] Patent Number: 4,859,523

[45] Date of Patent: Aug. 22, 1989

[54] VISCOELASTIC RESIN FOR VIBRATION DAMPING MATERIAL

[75] Inventors: Hiroshi Endoh; Yoshimasa Zama; Nobuo Kadowaki, all of Sagamihara; Takeshi Yatuka, Ohtsu; Hiroshi Nagai, Ohtsu; Yutaka Mizumura, Ohtsu, all of Japan

[73] Assignees: Nippon Steel Corporation, Tokyo; Toyo Boseki Kabushiki Kaisha, Osaka, both of Japan

[21] Appl. No.: 85,718

[22] Filed: Aug. 17, 1987

[30] Foreign Application Priority Data

Aug. 15, 1986 [JP] Japan .................. 61-191219

[51] Int. Cl.4 .......... B32B 7/02; B32B 15/08
[52] U.S. Cl. .................. 428/215; 428/425.8; 428/457; 428/480; 528/66
[58] Field of Search .......... 428/458, 480, 425.8, 428/215, 457; 528/66

[56] References Cited

U.S. PATENT DOCUMENTS 4,594,292  6/1986  Nagai et al. .................. 428/458
4,601,941  7/1986  Lutz et al. .................. 428/458 X
4,740,427  4/1988  Ochiumi et al. ............... 428/458 X Primary Examiner—Thomas J. Herbert
Attorney, Agent, or Firm—Wegner & Bretschneider

[57] ABSTRACT

A viscoelastic resin which comprises a reaction product of:
(A) a polyester diol having a molecular weight of 400 to 6,000, at least 60 mol % of the dicarboxylic acid component of which is an aromatic dicarboxylic acid and at least 30 mol % of the glycol component of which is neopentyl glycol or its derivative;
(B) an aliphatic polyester diol having a molecular weight of 600 to 6,000;
(C) a diisocyanate compound; and
(D) a chain extender;
said (A), (B), (C) and (D) being reacted in a weight ratio (A):(B):(C) of 100:0 to 150:10 to 100:0 to 30.

11 Claims, 1 Drawing Sheet

VISCOELASTIC RESIN FOR VIBRATION DAMPING MATERIAL

FIELD OF THE INVENTION

The present invention relates to a viscoelastic resin for a vibration damping material. More particularly, it relates to a viscoelastic resin useful for a middle layer of a vibration damping material having a composite laminate structure which is used as a structural component of various structures such as machines, buildings, vehicles and the like, or a part thereof.

BACKGROUND OF THE INVENTION

Recently, noises and vibration problems have become an object of public concern as an environmental pollution with development of means of transportation and increase in residential areas which are located near factories and the like. Further, in a workshop, there is a tendency to limit noises and vibration to improve working atmosphere. To cope with these tendencies, it is requested to impart vibration damping property to a metallic material which is a source of noises and vibration, that is, to impart a function to a noise generating member itself so that the member can absorb its own vibrational energy and convert it into heat energy to attenuate frequency of vibration or vibrational amplitude, whereby noise is decreased. Further, it is requested to improve such a function.

Based on these requests, as one of vibration damping materials having desired property, there has been proposed a vibration damping material having a composite laminate structure wherein a middle layer having viscoelastisity is sandwiched by metal layers. This type of a composite vibration damping material has been studied and employed as oil pans of automobiles, engine covers, chutes of hoppers, stopper of conveying apparatus, domestic electric equipments, vibration reducing members of other metal processing machines, structural members of precision machines in which prevention of vibration is desirable and the like.

In general, vibration damping property of such a composite vibration damping material depends upon the property of a viscoelastisity layer which constitutes the middle layer thereof. When vibration damping property is expressed as a loss factor (which is a measure of conversion of an external vibrational energy into a heat energy by internal friction, and is corresponding to a value relating to mechanical hysteresis loss due to vibration), the property shows a peak at a certain temperature. It has been known that it is most effective to use a vibration damping material at about this temperature showing the peak property.

Hitherto, as a viscoelastic composition which constitutes the middle layer of such a composite vibration damping material, there have been known a simple polyester (Japanese Patent Kokai No. 50-143880) or a polyester to which a plasticizer is added (Japanese Patent Kokai No. 51-93770): a simple polyurethane foam (Japanese Patent Kokai No. 51-91981): a simple polyamide (Japanese Patent Kokai No. 56-159160); a simple ethylene-polyvinyl acetate copolymer (Japanese Patent Kokai No. 57-34949): a composition of a polyvinyl butyral or a polyvinyl butyral and a polyvinyl acetate to which a plasticizer and a tackifier are added (Japanese Patent Kokoku No. 55-27975): a copolymer of a isocyanate prepolymer and a vinyl monomer (Japanese Patent Kokoku No. 52-26554): copolymers disclosed in Japanese Patent Kokoku Nos. 39-12451 and 45-34703: and the like.

Although, first of all, it is required that a composite vibration damping material should have a high value of the above loss factor as well as a high adhesive strength between a viscoelastic middle layer and a metal layer, the composite vibration damping material made of the above known viscoelastic composition has problems in any of these properties and is unsatisfactory. Further, although, in addition to the above requisite properties, it is necessary that a composite vibration damping material should stand processing such as press, bending and the like. A composite vibration damping material made of the above conventional viscoelastic composition is liable to produce wrinkle, crack and the like, and is also unsatisfactory.

OBJECTS OF THE INVENTION

One object of the present invention is to provide a viscoelastic resin useful for a middle layer of a composite vibration damping material in which the above problems in a conventional composite vibration damping material is minimized. That is, the present invention provides a viscoelastic resin useful for a vibration damping material which shows improved vibration damping property as well as improved adhesion when it is sandwiched between steel plates and improved press moldability when it is used as a middle layer of a composite vibration damping steel plate.

Another object of the present invention is to provide a composite vibration damping steel plate obtained by using the viscoelastic resin of the present invention.

These objects as well as other objects and advantages of the present invention will become apparent to those skilled in the art from the following description with reference to the accompanying drawings.

SUMMARY OF THE INVENTION

Figure 1:
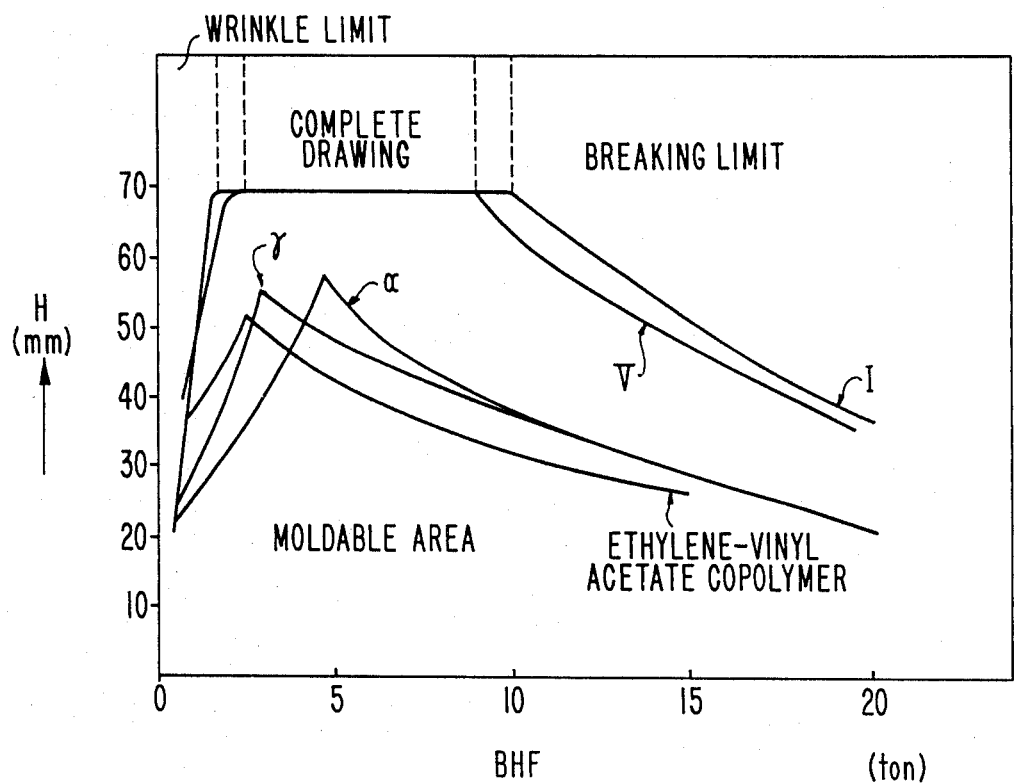
FIG. 1 is a graph illustrating moldability of vibration damping steel plates prepared by using various resins as shown in Example hereinafter.

According to the present invention, there is provided a viscoelastic resin which comprises a reaction product of:

(A) a polyester diol having a molecular weight of 400 to 6,000, at least 60 mol % of the dicarboxylic acid component of which is an aromatic dicarboxylic acid and at least 30 mol % of the glycol component of which is neopentyl glycol or its derivative:

(B) an aliphatic polyester diol having a molecular weight of 600 to 6,000;

(C) a diisocyanate compound: and (D) a chain extender (D):

said (A), (B), (C) and (D) being reacted in a weight ratio (A):(B):(C):(D) of 100:0 to 150:10 to 100:0 to 30.

The present invention also provides a composite vibration damping steel plate comprising two metal plate layers and the layer of the viscoelastic resin of the present invention sandwiched between the metal layers.

DETAILED DESCRIPTION OF THE INVENTION

In a viscoelastic resin for a vibration damping material, it has been found that the polyester diol (A) having a molecular weight of 400 to 6,000, at least 60 mol % of the dicarboxylic acid component of which is an aromatic dicarboxylic acid and at least 30 mol % of the glycol component of which is neopentyl glycol and the diisocyanate compound (C) are effective for improving press moldability, when the resin is used as a vibration damping steel plate. Further, it has been found that the above polyester diol (A) and the diisocyanate compound (C) are also effective for adhesion between the resin and a steel plate. Particularly, the diisocyanate compound (C) improves strength of the resin and interfacial adhesion between the resin and a steel plate.

Regarding vibration damping property, in order to obtain desired vibration damping property of at least 0.5 in terms of a loss factor, it is necessary that at least 30 mol % of the glycol component of the polyester diol (A) should be neopentyl glycol or its derivative (e.g., neopentylglycol hydroxypivalate, etc.).

Optionally, depending upon a working temperature, the aliphatic polyester diol (B) is added. That is, in the case that it is difficult to adjust a temperature range at which vibration damping effect is exhibited to a desired low working temperature by using only the polyester diol (A), a glass transition temperature can be lowered by addition of the aliphatic polyester diol (B) to shift the temperature range at which vibration damping effect is exhibited toward a lower range.

At least 60 mol % of the carboxylic acid component of the polyester diol (A) is an aromatic dicarboxylic acid. Examples of the aromatic dicarboxylic acid component include aromatic carboxylic acids such as terephthalic acid, isophthalic acid, orthophthalic acid, 1,5-naphthalene dicarboxylic acid, 2,6-naphthalene dicarboxylic acid, 4,4'-biphenyl dicarboxylic acid, 5-sodium sulfoisophthalic acid and the like. Examples of other dicarboxylic acids include alicyclic dicarboxylic acids such as 1,4-cyclohexane dicarboxylic acid, 1,3-cyclohexane dicarboxylic acid, 1,2-cyclohexane dicarboxylic acid and the like; aliphatic dicarboxylic acids such as succinic acid, adipic acid, azelaic acid, sebacic acid, dodecane dicarboxylic acid, dimer acids and the like: hydroxyl carboxylic acids such as p-hydroxybenzoic acid and the like: and cyclic ester compounds such as caprolactone and the like.

Examples of the glycol component of the polyester diol (A) include aliphatic glycols such as neopentyl glycol, neopentyl glycol hydroxypiyalate, ethylene glycol, propylene glycol, 1,4-butanediol, 1,3-butanediol, 1,5-pentanediol, 3-methylpentanediol, 1,6-hexanediol, 1,9-nonanediol, diethylene glycol and the like: alicyclic diols such as 1,4-cyclohexanedimethanol and the like: and aromatic ring containing glycols such as ethylene oxide adduct or propylene oxide adduct of bisphenol A or bisphenol S.

When the amount of the aromatic dicarboxylic acid components is less than 60 mol %, press moldability, particularly, drawing property of a resulting vibration damping steel plate becomes inferior and an adhesive strength under shear is also lowered. The molecular weight of the polyester diol (A) should be 400 to 6,000. When the molecular weight is less than 400, a high vibration damping property is hardly obtainable. On the other hand, when the molecular weight is more than 6,000. press moldability, particularly, drawing property becomes inferior.

Examples of the aliphatic polyester diol (B) include those composed of aliphatic dicarboxylic acid components such as adipic acid, azelaic acid, sebacic acid and the like: and aliphatic glycol having 2 to 10 carbon atoms such as ethylene glycol, propylene glycol, 1,4-butanediol, 1,6-hexanediol, neopentyl glycol, 1,5-pentanediol, 3-methylpentanediol, 1,9-nonanediol and the like. The aliphatic polyester diol (B) may be polylactone diols.

In view of the desired vibration damping property, the aliphatic polyester diol (B) has a molecular weight of 600 to 6,000. Particularly, polycaprolactone diol is preferred as the aliphatic polyester diol (B). When the diol (B) composed of an aliphatic dicarboxylic acid component and an aliphatic glycol component is used, preferably, at least 30 mol % of the glycol component is neopentyl glycol or its derivative as described above.

Examples of the isocyanate compound (C) include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate-diphenyl ether, 1,5-naphthalene diisocyanate, p-xylylene diisocyanate, m-xylylene diisocyanate, 1,3-diisocyanate methylcyclohexane, 1,4-diisocyanate methylcyclohexane, 4,4'-diisocyanate dicyclohexane, 4,4'-diisocyanate dicyclohexylmethane, isophorone diisocyanate and the like. If necessary, a small amount of 2,4,4'-triisocyanate-diphenyl, benzene triisocyanate and the like can be added.

Further, optionally, a chain extender (D) can be used in the present invention. As the chain extender (D), there can be used one or more of known compounds selected from the group consisting of glycols, diamines and aminoalcohols. Glycols are preferred.

The viscoelastic resin of the present invention can be prepared as follows.

The viscoelastic resin of the present invention can be obtained by reacting the polyester diol (A), the isocyanate compound (C) and optionally the aliphatic polyester diol (B) and/or the chain extender (D) in the solvent, or without any solvent, according to a known polyurethane resin synthetic method. Preferred molar ratio of these reactants is such that (NCO group of the polyisocyanate)/(OH group of the polyhydroxy compound(s)) is 0.7 to 1.2/1, particularly, 0.90 to 0.99/1. The number average molecular weight of the resulting polyurethane resin is 8,000 to 100,000, preferably, 20,000 to 50,000, and the glass transition temperature thereof is 0° to 70° C., preferably, 0° to 50° C., more preferably, 10° to 40° C. When the number average molecular weight is less than 8,000, high adhesion can be hardly expected. To the contrary, when the number average molecular weight is more than 100,000, difficulty arises in application of the resin and it is impractical. Further, when the glass transition temperature is lower than 0° C., vibration damping property and adhesion property become inferior. On the other hand, when the glass transition temperature is higher than 70° C., drawing processability is markedly lowered.

The solvent to be used is preferably that having a boiling point of 50° to 170° C. Examples thereof include aromatic hydrocarbons such as toluene, xylene and the like: ketones such as acetone, methyl ethyl ketone, methyl isopropyl ketone, methyl isobutyl ketone, cyclohexanone and the like; cyclic ethers such as tetrahydrofuran, dioxane and the like; and esters such as methyl acetate, ethyl acetate, butyl acetate and the like. They can be used alone or in combination thereof. Further, a small amount of a hydroxyl group containing compound such as methanol, ethanol, propanol, Cellosolve, water and the like may be added.

Of course, excellent vibration damping property and adhesion property can be obtained by using the viscoelastic resin of the present invention alone. However, if necessary, the resin of the present invention can be used by admixing with one or more other miscible resins, for example, polyester resin, epoxy resin, petroleum resin, acrylic resin and the like. Furthermore, if necessary, a compound which is reactive with the polyurethane resin such as a polyisocyanate compound and the like can be admixed with the resin.

The polyester diol (A) can be prepared, for example, as follows. All "parts" hereinafter are by weight unless otherwise stated.

Terephthalic acid (332 parts), isophthalic acid (498 parts), ethylene glycol (310 parts), neopentyl glycol (520 parts) and tetrabutoxy titanate (0.35 part) were placed in an autoclave equipped with a thermometer and a stirrer. Esterification reaction was carried out under a pressure of 3 to 4 kg/cm$^2$ at 230° to 240° C. for 3 hours and then the pressure of the reaction system was reduced to 20 mmHg over 30 minutes. Then, polycondensation reaction was carried out under a pressure of 1 to 20 mmHg at 250° C. for 50 minutes to obtain a polyester diol (a) as shown in the following Table 1. According to the analysis of the polyester diol (a), it had the hydroxyl number of 56 and the molecular weight of 2,000. The resin composition was determined by NMR analysis and the like and showed that 40 mol % of terephthalic acid, 60 mol % of isophthalic acid, 38 mol % of ethylene glycol, and 62 mol % of neopentyl glycol.

According to the same manner, other polyester diols (A) shown in Table 1 were obtained.

In the present invention, the materials (A), (B), (C) and (D) are reacted in the weight ratio (A):(B):(C):(D) of 100:0 to 150:10 to 100:0 to 30.

When the material (B) is used in an amount of more than 150 parts per 100 parts of (A), strength of the resin is extremely lowered, and an adhesive strength and press moldability, particularly, drawing property of a vibration damping steel plate using such a resin become inferior. As described above, (B) is used to lower the glass transition temperature of the viscoelastic resin to shift a temperature at which peak vibration damping property is exhibited to a working temperature. Therefore, its use is optional. As described above, (C) is used to improve strength of the resin as well as an adhesive strength and press moldability, particularly, drawing property of a resulting vibration damping steel plate. When (C) is used in an amount of less than 10 parts per 100 parts of (A), remarkable improvement of an adhesive strength and moldability can be hardly expected because of insufficient reaction. On the other hand, when (C) is used in an amount of more than 100 parts per 100 parts of (A), solubility in a solvent and coating workability become inferior.

The use of the chain extender (D) is also optional. It is used in an amount of 0 to 30 parts, preferably, 3 to 30 parts per 100 parts of (A) to impart the desired property to the resin.

The viscoelastic resin for a vibration damping material of the present invention can be prepared, for example, as follows.

Toluene (181 parts) and methyl ethyl ketone (181 parts) were placed in a reaction vessel equipped with a thermometer, a stirrer and a reflux condenser, and then the polyester diol (a) shown in Table 1 (100 parts) was added to the reaction vessel and dissolved in the solvents. Then, the aliphatic polyester diol (i) shown in Table 1 (80 parts) was added. After addition of the aliphatic polyester diol, diphenylmethane diisocyanate (49.3 parts) and dibutyl dilaurate (0.05 part) were added and the mixture was reacted at 60° to 80° C. for 3 hours. Neopentyl glycol (12 parts) was added and the reaction mixture was further reacted for 8 hours. The resulting desired viscoelastic resin for a vibration damping mate-

TABLE 1

| Constituent unit (mol %) | Polyester diol (A) | | | | | | | | Aliphatic polyester diol (B) | |
|---|---|---|---|---|---|---|---|---|---|---|
| | a | b | c | d | e | f | g | h | i | j |
| Dicarboxylic acid component | | | | | | | | | | |
| Terephthalic acid | 40 | — | 60 | 30 | — | 30 | 30 | 49 | — | — |
| Isophthalic acid | 60 | 70 | — | 30 | 70 | 30 | 30 | 48.5 | — | 30 |
| Orthophthalic acid | — | 28 | 40 | — | — | — | — | — | — | — |
| 5-Sodium sulfo-isophthalic acid | — | 2 | — | — | — | — | — | 2.5 | — | — |
| 1,4-cyclohexane dicarboxylic acid | — | — | — | — | 30 | — | — | — | — | — |
| Adipic acid | — | — | — | 40 | — | 40 | 40 | — | 100 | 70 |
| Glycol component | | | | | | | | | | |
| Neopentyl glycol | 62 | 65 | 30 | 58 | 75 | 57 | 59 | 50 | 40 | 30 |
| Neopentyl glycol hydroxypivalate | — | — | 30 | — | — | — | — | — | — | — |
| Ethylene glycol | 38 | — | — | 42 | — | 43 | 41 | 50 | — | 70 |
| Propylene glycol | — | — | 40 | — | — | — | — | — | — | — |
| 1,6-Hexanediol | — | — | — | — | — | — | — | — | 60 | — |
| 3-Methylpentanediol | — | — | — | — | 25 | — | — | — | — | — |
| 1,4-Cyclohexanedimethanol | — | 35 | — | — | — | — | — | — | — | — |
| Hydroxyl number (KOH mg/g) | 56 | 44 | 74 | 35 | 90 | 254 | 9 | 55 | 56 | 50 |
| Molecular weight | 2,000 | 2,540 | 1,510 | 3,200 | 1,240 | 440 | 12,000 | 2,200 | 2,000 | 2,240 | rial (I) had the number average molecular weight of 27,000 and the glass transition temperature of 25° C. According to the same manner, the viscoelastic resins (II) to (VIII) shown in Table 2 were obtained. These resins were dissolved in a solvent such as a mixed solvent of cyclohexanone and xylene (1:1, w/w), a mixed solvent of methyl ethyl ketone and toluene (1:1, w/w) and the like, and stirred in a vessel equipped with a stirrer. Then, before use, the solvent was removed.

as well as good press moldability of a resulting vibration damping material obtained by using the resin. However, when the viscoelastic resin of the present invention is used, all the requisite properties can be satisfied.

The following Example further illustrate the present invention in detail but are not to be construed to limit the scope thereof.

TABLE 2

| Reactants | Viscoelastic resin | | | | | | | |
|---|---|---|---|---|---|---|---|---|
| (weight ratio) | I | II | III | IV | V | VI | VII | VIII |
| Polyester diol (A) | | | | | | | | |
| a | 100 | — | — | — | — | — | — | — |
| b | — | 100 | — | — | — | — | — | — |
| c | — | — | 100 | — | — | — | — | — |
| d | — | — | — | — | 100 | — | — | — |
| e | — | — | — | 100 | — | — | — | — |
| f | — | — | — | — | — | 100 | — | — |
| g | — | — | — | — | — | — | 100 | — |
| h | — | — | — | — | — | — | — | 100 |
| Aliphatic polyester diol (B) | | | | | | | | |
| i | 80 | — | — | 30 | — | — | 100 | — |
| j | — | — | — | — | — | — | — | — |
| Polycaprolactone*[1] | — | 70 | 55 | — | — | — | — | 75 |
| Diisocyanate compound (C) | | | | | | | | |
| MDI*[2] | 49.3 | 50.7 | — | — | 23.5 | 71.3 | 67 | 62 |
| XDI*[3] | — | — | 33.4 | — | — | — | — | — |
| IPDI*[4] | — | — | — | 40.5 | — | — | — | — |
| Chain extender (D) | | | | | | | | |
| Neopentyl glycol | 12 | 14 | 4 | 10 | 7 | 7 | 14 | 14 |
| 1,6-Hexanediol | — | — | 6 | — | — | — | — | — |
| Ethanolamine | — | — | — | — | — | — | — | — |
| Ratio of reactants | | | | | | | | |
| NCO/OH ratio (eq. ratio) | 0.96 | 0.97 | 0.97 | 0.96 | 0.97 | 0.97 | 0.97 | 0.97 |
| Number average molecular weight | 27,000 | 33,000 | 32,000 | 26,000 | 34,000 | 35,000 | 30,000 | 32,000 |
| Glass transition temperature (°C.) | 25 | 32 | 29 | 27 | 30 | 62 | 20 | 31 |

*[1]Plakcel 220 manufactured by Daicel Kagaku Kogyo, Japan;
*[2]diphenylmethane diisocyanate
*[3]xylylene diisocyanate;
*[4]isophorone diisocyanate The viscoelastic resin of the present invention is used as a middle layer of a composite vibration damping material as it is. Further, the resin can be used together with one or more suitable materials such as various fibers, for example, glass fibers, polyester fibers, carbon fibers and the like for further improving strength of the resin: various particles, for example, calcium carbonate, magnesium carbonate and the like; various metallic powder and fibers, for example, stainless powder, aluminum powder and the like for imparting spot welding property: electrically conductive particles, for example, carbon black, graphite and the like; various coupling agents for improving adhesion between the resin and inorganic additives: and various leveling agents for improving coating property.

The vibration damping steel plate of the present invention can be prepared by using the viscoelastic resin of the present invention according to a conventional method. The steel plate to be used is not limited to a specific one and any known steel plate for this purpose can be used.

In comparison with a conventional viscoelastic resin material for a vibration damping material, the viscoelastic resin of the present invention exhibits extremely superior effects. That is, in a conventional viscoelastic resin material for a vibration damping material, it is very difficult to satisfy all the requisite properties such as good vibration damping property and good adhesion

EXAMPLE

In Table 1 hereinabove, there are shown the monomers which constitute the polyester diol for the viscoelastic resin of the present invention, their ratio and the hydroxyl number of the resulting polyester diol. In Table 2 hereinabove, there are shown the examples (I) to (VIII) of the viscoelastic resin of the present invention, and their reactants (A) to (D), NCO/OH ratios, number average molecular weights and glass transition temperatures. The following Table 3 shows each temperature at which vibration absorption of each of vibration damping steel plates obtained by using the viscoelastic resins (I) to (VIII) becomes maximum, a maximum value of a loss factor ($\eta_{MAX}$), a temperature range for a loss factor $\eta \geq 0.1$, an T-peel strength, and an adhesive strength under shear.

Vibration absorption property is represented by a loss factor $\eta$, and is determined by preparing a vibration damping steel plate having a middle layer of the viscoelastic resin of 0.05 mm in thickness between two bonderizing steel plates (SPCE material) of 0.8 mm in thickness and calculating the relation between a temperature and a loss factor of the steel plate at a frequency of vibration of 500 Hz.

In the following Table 4, as comparative examples, there are shown compositions of polyester urethane resins obtained by using polyester diols shown each dicarboxylic acid component of which contains less than 60 mol % of an aromatic dicarboxylic acid instead of the polyester diol (A). In the following Table 5, there are shown each temperature at which vibration absorption of each of vibration damping steel plates obtained by using the resins of the above comparative examples as well as its maximum value of a loss factor ($\eta_{MAX}$), a temperature range for a loss factor $\eta \geq 0.1$, a T-peel strength, and an adhesive strength under shear. Further, in Table 5, the data for a conventional vibration damping material using ethylene-vinyl acetate copolymer are also shown.

Each of the viscoelastic resins (I) to (VIII) of the present invention shown in Table 2 has a high maximum loss factor ($\eta_{MAX}$) such as not less than 0.8 and a temperature range for $\eta \geq 0.1$ of not lower than 70° C. Further, each of the viscoelastic resins (I) to (VIII) shows a high adhesive strength such as an adhesive strength under shear of not less than 130 kgf/cm² and a T-peel strength of not less than 12 kgf/25 mm. On the other hand, in the case of using the polyester diols each dicarboxylic acid component of which contains less than 60 mol % of an aromatic dicarboxylic acid instead of the polyester diol (A), as shown in Table 5, each of the resins α, β and γ has an adhesive strength under shear of less than 130 kgf/cm² and a T-peel strength of less than 12.0 kgf/25 mm and is inferior to the viscoelastic resin for a vibration damping material of the present invention. Further, the resins (I) to (VIII) of the present invention have maximum loss factors of 0.1 higher than those of the resins α, β and γ of the comparative examples and, therefore, vibration damping properties thereof are also extremely superior. Furthermore, in the case of using the conventional ethylenevinyl acetate copolymer, both loss factor and adhesive strength are lower.

Figure 2:
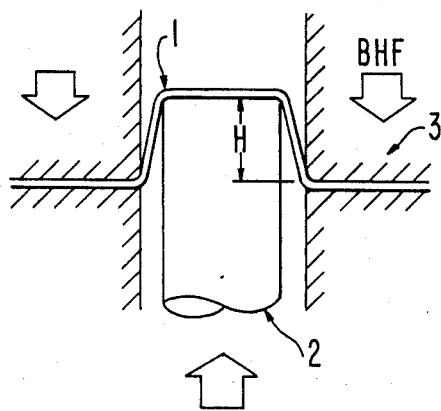
FIG. 2 is a schematic diagram illustrating pressing in Example hereinafter.

The accompanying FIG. 1 illustrates the results of experiments on moldability of vibration damping steel plates obtained by using the above various resins. FIG. 1 is a graph showing the relation between a blank holding force (BHF) and a molding height (H) of a deep draw product having a blank diameter of 220 mm molded by a press machine shown in FIG. 2. In FIG. 2, the vibration damping steel plate is held by a holding member 3 and molded by a punch 2 having diameter of 100 mm. As seen from FIG. 1, when each of the vibration damping steel plates using the viscoelastic resins (I) and (V) of the present invention is subjected to cylindrical deep drawing by holding it between the molding member, it is possible to effect deep drawing over a very wide range of BHF without producing wrinkle and breaking of the steel plate. To the contrary, in the vibration damping steel plate obtained by sandwiching the polyester polyurethane resin of α or γ, its molding height is markedly low in comparison with that of the plate using the resin (I) or (V). Further, in the vibration damping steel plate obtained by using the conventional ethylene-vinyl acetate copolymer, its moldable area is very narrow.

TABLE 3

| Viscoelastic resins | I | II | III | IV | V | VI | VII | VIII |
|---|---|---|---|---|---|---|---|---|
| Vibration damping peak temp. (°C.) | 65 | 100 | 70 | 68 | 70 | 110 | 70 | 80 |
| Max. loss factor ($\eta_{MAX}$) | 0.96 | 1.34 | 1.21 | 1.10 | 0.95 | 0.92 | 0.82 | 1.21 |
| Temperature range for | | | | | | | | |

TABLE 3-continued

| Viscoelastic resins | I | II | III | IV | V | VI | VII | VIII |
|---|---|---|---|---|---|---|---|---|
| $\eta \geq 0.1$ (°C.) | 80 | 85 | 80 | 85 | 80 | 80 | 85 | 80 |
| T-peel strength (kgf/25 mm) | 12.6 | 15.6 | 13.7 | 13.5 | 14.0 | 18.2 | 12.6 | 13.3 |
| Adhesive strength under shear (kgf/cm²) | 186 | 200 | 192 | 185 | 205 | 195 | 180 | 200 |

TABLE 4

| Reactant | Polyester polyurethane resin | | |
|---|---|---|---|
| | α | β | γ |
| Polyester diol component | | | |
| i | 100 | — | 50 |
| j | — | 100 | 50 |
| Polyisocyanate component | | | |
| MDI | 28.4 | 27.1 | 27.3 |
| Chain extender | | | |
| Neopentyl glycol | 7 | 7 | 7 |
| Formulation ratio NCO/OH | 0.97 | 0.97 | 0.97 |
| Number average molecular weight | 29,000 | 40,000 | 35,000 |
| Glass transition temp. (°C.) | −12 | 5 | −8 |

TABLE 5

| Polyester polyurethane | α | β | γ | Ethylene-vinyl acetate co-polymer |
|---|---|---|---|---|
| Vibration damping peak temp. (°C.) | 30 | 45 | 38 | 72 |
| Max. loss factor ($\eta_{MAX}$) | 0.80 | 0.80 | 0.75 | 0.50 |
| Temp. range for $\eta \geq 0.1$ (°C.) | 75 | 72 | 70 | 65 |
| T-peel strength (kgf/25 mm) | 10.3 | 11.7 | 12.0 | 10.5 |
| Adhesive strength under shear (kgf/cm²) | 107 | 112 | 125 | 120 |

As seen from the above Example, when the viscoelastic resin of the present invention is sandwiched by two metal plates, the resin exhibits high vibration damping property and excellent press moldability and, therefore, it is very useful for a composite vibration damping material.

What is claimed is:

1. A viscoelastic resin which comprises a reaction product of:
   (A) a polyester diol having a molecular weight of 400 to 6,000, wherein at least 60 mol % of the polyester diol is a dicarboxylic acid component which is an aromatic dicarboxylic acid and at least 30 mol % of the polyester diol is a glycol component which is neopentyl glycol or its derivative;
   (B) an aliphatic polyester diol having a molecular weight of 600 to 6,000;
   (C) a diisocyanate compound; and
   (D) a chain extender;

said (A), (B), (C) and (D) being reacted in a weight ratio (A):(B):(C):(D) of 100:0 to 150:10 to 100:0 to 30.

2. A viscoelastic resin according to claim 1, wherein the sum of the number of moles of (A), (B) and (D) is 0.7 to 1.2 times as much as that of (C) and the ratio of (A):(B):(D) is 100:0 to 150:3 to 30.

3. A viscoelastic resin according to claim 2, wherein the sum of the number of moles of (A), (B) and (D) is 0.90 to 0.99.

4. A viscoeleastic resin according to claim 1, wherein the reactant (B) is polycaprolactone diol.

5. A viscoelastic resin according to claim 1, wherein the resin has a glass transition temperature of 0° to 70° C.

6. A viscoelastic resin according to claim 1, wherein the resin has a number average molecular weight of 8,000 to 100,000.

7. A viscoelastic resin according to claim 1, wherein the chain extender is one or more compounds selected from the group consisting of glycols, diamines, and aminoalcohols.

8. A viscoelastic resin according to claim 1, wherein the resin has a vibration damping peak temperature of 60° to 120° C. determined by sandwiching it between two steel plates each of which is 0.05 mm in thickness at 500 Hz.

9. A composite vibration damping steel plate comprising two steel plate layers and a viscoelastic resin middle layer sandwiched between the two steel plate layers, said viscoelastic resin is that claimed in claim 1

10. A viscoelastic resin according to claim 1, wherein the lower limit of the weight ratio of the aliphatic polyester diol (B) is greater than 0.

11. A viscoelastic resin according to claims 1 or 10, wherein the lower limit of the weight ratio of the chain extender (D) is greater than 0.

* * * * *